(No Model.)
J. O. ANDERSON.
INKSTAND.
No. 330,455. Patented Nov. 17, 1885.
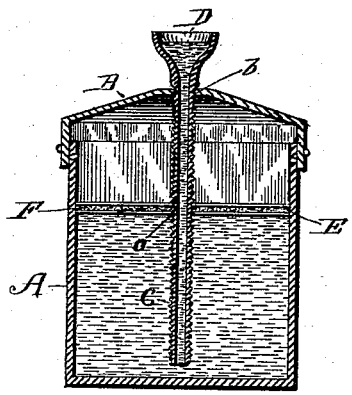
Witnesses:
C. Mark,
N. S. Hammack
Inventor:
James O. Anderson
By,
H. F. Rohde
Attorney.

UNITED STATES PATENT OFFICE.

JAMES O. ANDERSON, OF OQUAWKA, ILLINOIS.

INKSTAND.

SPECIFICATION forming part of Letters Patent No. 330,455, dated November 17, 1885.

Application filed June 11, 1885. Serial No. 168,346. (No model.)

*To all whom it may concern:*

Be it known that I, JAMES O. ANDERSON, a citizen of the United States, residing at Oquawka, Henderson county, Illinois, have invented a new and useful Improvement in Fountain-Inkstands, of which the following is a specification.

My invention relates to improvements in fountain-inkstands in which a hollow piston in connection with a dip-hole operates in conjunction with a reservoir; and the object of my invention is to furnish an inkstand which shall prevent a too rapid evaporation of the ink, and at the same time shall admit less impurities gathering upon the ink than is the case in ordinary inkstands. I accomplish this by the mechanism illustrated in the accompanying drawing, in which the figure represents a vertical cross-section of my invention.

In the drawing, A represents a reservoir cylindrical in shape and having cover B, which cover is fastened upon reservoir A by any suitable fastening device. Cover B has in its top the perforation b. Through perforation b, and so as to permit of being revolved in cover B, passes the hollow stem C, which stem is screw-threaded in its lower part, and in its upper part is provided with the dip-hole D.

E is a piston-head which fits into and reciprocates in the cylindrical reservoir A.

F represents the piston-packing, and consists, preferably, of a rubber band between two metallic plates. The piston-head E has the screw-threaded perforation e, into which the screw-threaded stem C is screwed.

The operation of my invention is as follows: Reservoir A is partly filled with ink or other writing-fluid by first removing cover B therefrom. Then the cover B is fastened upon reservoir A so that stem C shall reach down into the ink and nearly to the bottom of the reservoir, and so that the piston-head E shall be close to the cover B. When, now, the stem C is turned so that the piston-head is pressed down upon the ink below, the pressure thus exerted will force the ink up through the hollow stem C into the dip-hole D, where it can be reached by the pen. By turning the stem C in the opposite direction the piston-head is raised, by which means the pressure upon the ink below is released and the ink in the dip-hole will naturally recede into the reservoir.

I am aware that an inkstand has been devised having a piston operated by a threaded tube such as shown in my device. In this old device, however, the tube moves vertically with the piston. When the latter is up, the tube projects way beyond the top of the inkstand, and the bottom of the tube is some distance above the bottom of the stand. In my device the tube always has the same vertical position. None of its threads are outside of the stand, to catch dirt or allow ink to be gummed therein.

What I claim is—

The inkstand A, having the piston-head E, having the threaded perforation e, and the tube consisting of the dip-hole D, outside of the stand, and the hollow stem C, externally threaded and passing through the piston-head, said tube having all its threads within the stand, as set forth.

JAMES O. ANDERSON.

Witnesses:
N. S. HAMMACK,
W. E. BURKE.